Patented Feb. 18, 1947

2,416,254

UNITED STATES PATENT OFFICE 2,416,254

ANTIFOGGING COMPOSITION

Richard L. Gilbert, Jr., Old Greenwich, Conn., assignor to American Cyanamid Company, New York, N. Y., a corporation of Maine No Drawing. Application February 24, 1945, Serial No. 579,686

3 Claims. (Cl. 117—165)

This invention relates to anti-fogging agents for transparent surfaces such as glass or the transparent resins such as methyl methacrylate used in the windshields of automobiles, airplanes, etc., and in optical instruments. A principal object of the invention is the provision of an anti-fogging agent that is much more permanent than those that have previously been used, and which will therefore maintain its effectiveness for longer periods of time. The invention will be described with particular reference to military uses, but it should be understood that the advantages thereof are also important for other purposes and can be obtained whenever it is desired to maintain a transparent surface free from fog or condensed moisture under changing conditions of temperature or humidity.

An anti-fogging material is required at the present time to maintain the line of sight free from fog on transparent solid surfaces of airplanes. Thus, for example, during the flight of a dive bomber from an altitude of about 8,000 feet (temperature about 32° F.) to sea level, the sudden change in temperature and relative humidity of the air results in a condensation of moisture on the windshield and also on the lenses of the bomb-sight, and this seriously interferes with the effectiveness of the attack. The principal loci of fog are on surfaces of the aviator's goggles and on the external and internal surfaces of the lenses in the telescope. An anti-fogging agent must not only function during the dive, but it must also continue to function in flight and after the optical equipment has been stored on the ground, and the hot, humid atmosphere of the South Pacific and other tropical combat areas causes this problem to be particularly severe.

The anti-fogging agent that has been most widely used by the aviation forces of the United States, Canada and Great Britain is sodium di-(2-ethylhexyl) sulfosuccinate, a compound that is also in wide commercial use as a wetting agent under the trade name "Aerosol OT." I have now discovered that the alkali metal, ammonium and other water-soluble or water-dispersible salts of di-(3,7-dimethyloctyl) sulfosuccinate are much more permanent in character than "Aerosol OT" when used for this purpose and will function with equal effectiveness for much longer periods of time. My invention therefore consists in the provision of an anti-fogging composition containing as its principal essential ingredient a water-soluble salt of di-(3,7-dimethyloctyl) sulfosuccinate, such as the sodium, potassium or ammonium salt, either alone or in conjunction with solvents, adhesives and the like.

3,7-dimethyloctanol is prepared by hydrogenating pure geraniol at 135° C. and 800–1400 pounds per square inch hydrogen pressure in the presence of a finely divided nickel catalyst. The product is fractionated under reduced pressure and the fraction boiling above 98° C. at 8–9 mm. of mercury pressure is used.

The sulfosuccinic acid diester of this alcohol is prepared as follows: 20.83 parts by weight of the alcohol and 12 parts by weight of toluene are refluxed to expel water, cooled to 60° C. and 5.9 parts of maleic anhydride are slowly added while maintaining the temperature at 60–70° C. 0.3 parts of p-toluene sulfonic acid monohydrate are then added and the mixture is refluxed with agitation and removal of the water of esterification for about 6 hours, or until the esterification is substantially complete. The product is washed with a dilute sodium hydroxide solution and then with water and the toluene is removed by distilling up to a bath temperature of 210° C. under an absolute pressure of 2 mm. of mercury. This product was di (3,7-dimethyloctyl) maleate.

Sulfonation was carried out by mixing 21.5 parts by weight of the ester and 5 parts of 96% sodium metabisulfite ($Na_2S_2O_5$) in a mixture of 11.4 parts of ethanol and 6 parts of water and refluxing with agitation for 10.5 hours at 80–84° C. The product is obtained as a solution of 66% concentration.

The permanency of anti-fogging compositions containing salts of di-(3,7-dimethyloctyl) sulfosuccinate can be still further enhanced by incorporating therein minor quantities of an adhesive such as gum tragacanth, alkali-solubilized casein, Irish moss, agar-agar and the like. Water-soluble gums, such as those listed above, have given excellent results and will assist in producing effective anti-fogging compositions when used in quantities of about 25–50% of the weight of the di-(3,7-dimethyloctyl) sulfosuccinate. Thus, for example, a 1–4% aqueous solution of the sodium salt may be dispersed in a 1% aqueous solution of casein containing a preservative such as sodium pentachlorphenate and sufficient ammonia to dissolve the casein, or in a 1% aqueous solution of gum tragacanth which may also contain a small amount of glycerine. Films formed by swabbing these dispersions on the inner transparent surfaces of an airplane cockpit have given excellent results on test dives.

The salts of di-(3,7-dimethyloctyl) sulfosuccinate may be applied to the glass, methyl methacrylate or other transparent surfaces by any suitable method. They may be applied as such or as solutions in water, ethyl alcohol, carbon tetrachloride, solvent naphtha or other organic solvents. One convenient method is to impregnate cloth, paper, felt, sponge or other absorbent material with the ester, as by soaking in a strong alcohol solution and drying, after which the absorbent material may be rubbed over the glass to apply a thin film of the wetting agent thereto.

The permanency of the compounds of the invention is shown by the following test: a small amount of solution of the material to be tested, either in water or in an organic solvent, is swabbed onto a clean glass slide and allowed to dry. When necessary the film is then polished until it is completely transparent. The slide is chilled to about 0° C. and then dropped into a moist atmosphere of 35° C. above hot water contained in a flask. A Bureau of Standards 25X test chart is viewed through the slide while the latter is maintained in the warm, saturated atmosphere and the number of lines per inch legible after 10 seconds is recorded. In general, the maximum number of lines (56 per inch) can be read through an efficient anti-fog material.

In order to determine the permanency of the material under test the coated slide is dipped into distilled water, allowed to drain and dry, and again tested. "Aerosol OT," when tested by this method, permitted complete visibility before dipping, but the slide became fogged within 5 seconds upon a second test when it had first been dipped in water and dried. Sodium di-(3,7-dimethyloctyl) sulfosuccinate, when used alone, retained its anti-fogging properties to a substantial degree even after being dipped in water and tested for 3 successive cycles. Films prepared from a 4% aqueous solution of the same compound containing 1% of casein gave complete visibility after 3 successive dipping and testing cycles and their anti-fogging effect persisted to a substantial degree even after a fourth cycle. Equally good results were obtained when 1% of gum tragacanth was substituted for the casein.

This application is a continuation-in-part of my copending application Serial No. 489,495, filed June 3, 1943.

What I claim is:

1. Solid transparent material having applied thereto a thin fog-inhibiting coating comprising, as the principal effective anti-fogging agent therein, a di-(3,7-dimethyloctyl) sulfosuccinate.

2. A method of inhibiting the formation of fog on solid transparent materal which comprises coating said material with a thin anti-fogging film containing a di-(3,7-dimethyloctyl) sulfosuccinate as the principal anti-fogging agent therein, said film exhibiting its original fog-inhibiting properties after dipping in water.

3. A method of inhibiting the formation of fog on solid transparent material which comprises coating said material with a thin anti-fogging film containing a di-(3,7-dimethyloctyl) sulfosuccinate as the principal anti-fogging agent therein together with a water-soluble gum, said film exhibiting its original fog-inhibiting properties after dipping in water.

RICHARD L. GILBERT, Jr.

REFERENCES CITED

The following references are of record in the file of this patent:

UNITED STATES PATENTS

| Number | Name | Date |
| --- | --- | --- |
| 2,372,171 | Bennett | Mar. 27, 1945 |
| 2,365,297 | Schweizer | Dec. 19, 1944 |
| 2,353,978 | Weber | July 18, 1944 |
| 2,292,097 | Vollmer | Aug. 4, 1942 |
| 2,176,423 | Jaeger | Oct. 17, 1939 |
| 2,159,313 | Blair et al. | May 23, 1939 |
| 2,028,091 | Jaeger | Jan. 14, 1936 |
| 1,369,708 | Roberts | Feb. 22, 1921 |

FOREIGN PATENTS

| Number | Country | Date |
| --- | --- | --- |
| 524,987 | British | Aug. 20, 1940 |
| 215,929 | British | May 22, 1924 |
| 835,187 | France | Sept. 19, 1938 |

OTHER REFERENCES

Industrial & Eng. Chem., June, 1941, pp. 731–737 (article by Caryl on Sulfosuccinic Esters).